Patented Mar. 30, 1948

2,438,554

UNITED STATES PATENT OFFICE 2,438,554

PREPARATION OF FAT SOLUBLE VITAMINS

Louis Freedman, Mount Vernon, N. Y.

No Drawing. Application June 7, 1944,
Serial No. 539,189

2 Claims. (Cl. 167—81)

This invention relates to the preparation of vitamin A and other fat-soluble vitamins and particularly to an improved method preventing oxidation of the vitamin during its separation from vitamin containing materials.

In view of the sensitiveness of vitamin A to oxidation with attendant loss of activity, it has been customary in the processing of fish liver and like oils, in the manufacture of vitamin A, to exclude oxygen by means of an inert gas forming the atmosphere above the oil being processed. The introduction and retention of the gas has involved considerable expense and required the use of sealed vessels. Furthermore the exclusion of air has not been perfect during all of the steps to which the material is subjected during processing, these steps including the saponification and subsequent extraction of the saponified mass with immiscible solvent, for the removal of the vitamin fraction from the soap solution.

The present invention provides a simple and convenient method of effecting the separation of the vitamin concentrate from the vitamin containing oil without the need of sealed equipment and without the need of introducing nitrogen, carbon dioxide or like gas to establish a non-oxidizing atmosphere over the batch being processed.

Briefly stated, the invention comprises effecting the saponification of the vitamin containing oil with an alkali solution containing sulfide ion. In the preferred embodiment, the invention comprises effecting the saponification of the oil containing vitamin A with an alkali containing a substantial proportion of a dissolved metal sulfide. Thus there is used to advantage an aqueous solution of sodium sulfide or of the mixture of sodium sulfide and sodium hydroxide, to effect the saponification of the oil.

This use of the sulfide establishes reducing conditions from and even before the moment when the vitamin is first separated from the oil. Furthermore the reducing conditions persist during the subsequent extraction of the vitamin concentrate; the soap solution from which the extraction is made still contains sodium sulfide and is in equilibrium at this time with a certain proportion of hydrogen sulfide. Formation of oxidized products of the vitamin which may stimulate further progressive oxidation, are thus prevented.

In greater detail, the classical and well known method of recovery of vitamins contained in fish-liver oils such as those of the cod, halibut, tuna, shark, and the like, consists in converting the oil into a soap by saponifying the oil by means of a caustic alkali such as sodium hydroxide or potassium-hydroxide in alcoholic or aqueous alcoholic solution and extracting from the soap solution so formed the vitamins present in the non-saponifiable fraction by means of a solvent. The solvents used for this purpose are many, and vary from common ethyl alcohol or acetone used in the case of water-insoluble soaps such as calcium soaps, to the known fat solvents such as ethyl ether, hydrocarbons derived from petroleum, ethylene dichloride and the other common chlorinated hydrocarbons used in the case of water-soluble soaps.

Vitamin A, which is contained in the non-saponifiable or difficultly saponifiable fraction of the oil, is known to be readily susceptible to oxidation during the various stages of saponification and particularly during the extraction of the soap. To prevent this oxidation in part, it has been common practice to carry out the various operations in the presence of an inert gas such as nitrogen.

The use of inert gases in the saponification and subsequent operations is often troublesome, is not always efficient due to leakage and becomes expensive when applied to large scale commercial operation.

I have found that instead of carrying out the saponification in an inert atmosphere such as that created by replacing the air in the saponification vessel by nitrogen gas, I can accomplish the same or better results by using an alkaline sulfide such as sodium sulfide as the saponifying agent. The soluble alkaline sulfide which may be used as the saponifying agent in toto or in part replacing the usual alkaline hydroxide, reacts with water to form an alkaline hydroxide plus hydrogen sulfide in situ thus creating in equilibrium a reducing agent and an alkaline saponifying agent according to the following numerical equations.

(1) 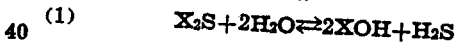

wherein X may be an alkaline or alkline-like metal ion such as ammonia, sodium or potassium.

(2) 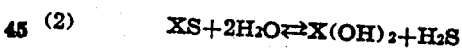

wherein X may be an alkaline earth metal such as calcium, barium, etc.

The alkaline sulfide may react directly on the glycerides of the fatty acids according to the following equation:

(3) 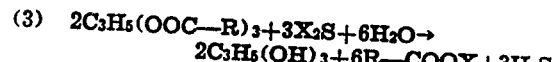

where X may be an alkaline or alkaline-like metal ion such as ammonia, sodium, potassium or the like, and (OOC—R) represents a fatty acid radical.

(4) 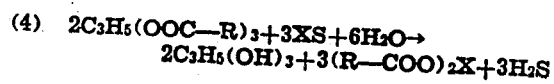

where X may be an alkaline earth metal ion such as calcium, barium or the like, and (OOC—R) represents a fatty acid radical.

In general in the saponification of the fats contained in oils, an excess of alkali over the amount theoretically required is usually used. In my procedure, part of the alkali required may be in the form of the alkali metal hydroxides and part as an alkaline sulfide, or all of the alkali required may be in the form of the alkali metal sulfide.

The following examples which are typical illustrate my preferred procedures.

Example 1

A mixture of 100 grams of cod-liver oil, 36 cc. of 43° Bé. potassium hydroxide solution, 60 cc. of 95% ethyl alcohol and 20 grams of crystalline sodium sulfide ($Na_2S.9H_2O$) were heated together on a water or steam bath under reflux for 1 hour. To the mixture were added 300 cc. of water and the diluted soap solution, after cooling, was extracted several times with 500 cc. portions of ethyl ether. The ether extract worked up in the usual manner without the use of an inert or an anti-oxidant gas gave 1.2 grams of non-saponifiable residue which showed a very strong vitamin A content according to the number of Carr-Price blue units determined by the antimony trichloride reagent.

Example 2

100 grams of cod-liver oil were added to 65 cc. of 95% alcohol and to this mixture were added a solution of 86 grams of crystalline sodium sulfide ($Na_2S.9H_2O$) dissolved in 46 grams water. The mixture was refluxed on a hot water bath for 1 hour. 500 cc. of water were added and the cooled soapy mixture was extracted with four 500 cc. portions of ether. The ether solution was worked up as in Example 1, the combined ether extracts being washed free of sulfide by water. On evaporation of the previously dried ether, 1.22 grams of unsaponifiable residue were obtained. This residue contained a high percentage of vitamin A as tested by the antimony trichloride reagent.

Example 3

To a mixture of 100 grams of cod-liver oil, 65 cc. of 95% alcohol, 30 cc. of 40° Bé. NaOH solution were added 20 grams of crystalline sodium sulfide. The resulting mixture was refluxed for 1 hour. The resulting hot solution was poured with stirring into 1200 cc. acetone. A coagulum formed, which on stirring broke up into granules of soap. The addition of 75 grams of powdered sodium chloride to the acetone solution, facilitates the precipitation and subsequent filtration of the sodium soap. The soap was removed by filtration and the residue washed with 100 cc. acetone. The light orange-yellow filtrate plus washings were concentrated in vacuo to give 5.2 grams of residue which on further extraction with fresh acetone and distillation in vacuo gave 1.25 grams of concentrate showing a very strong blue color with antimony trichloride reagent.

Example 4

Experiment No. 3 was repeated but using isopropyl alcohol instead of acetone and in the same volume as the coagulating and precipitating agent for the sodium soap. 1.2 grams of concentrate showing a high potency of vitamin A were recovered.

Example 5

Example 3 was repeated but the resulting sodium soap was converted into the calcium soap by pouring the hot soap solution into 1400 cc. of acetone into which was stirred 35 grams of dry, powdered, calcium chloride. The acetone extract, worked up as in Example 3, gave 1.32 grams of concentrate which gave a very strong blue color with antimony chloride test reagent.

Example 6

100 grams of cod-liver oil were mixed with 75 cc. of 95% ethyl alcohol, 36 cc. of 43° Bé. KOH solution and 10 grams of crystalline sodium sulfide (melted on water bath). The mixture was refluxed for 1½ hours. The resulting soap solution was cooled to about 50° C. and mixed with 320 cc. of approximately 20% ethyl alcohol by volume. The resulting dilute soap solution was then extracted in usual manner with several 300 cc. portions of ethylene dichloride until the extracts appeared to be colorless. The combined extracts were washed with water until the ethylene dichloride solution was comparatively free of alkali as tested by a few drops of phenolphthalein solution added to the final wash water. The ethylene dichloride extract was dried over anhydrous sodium sulfate and the solvent removed by evaporation under reduced pressure. The resulting residue or concentrate weighed about 1.25 grams and gave a very strong blue color with antimony trichloride test reagent.

Example 7

The procedure of any of the above Examples 1 to 6 is followed except that tuna-fish, halibut, or shark liver oil is substituted for the cod-liver oil, part for part. Yield obtained of unsaponifiable vitamin-containing product was nearly quantitative.

In the above described examples of carrying out the improved steps in the saponification of fats and oils containing vitamins, no inert or anti-oxidizing gas was introduced. The sodium sulfide which comprises approximately 24% of the total saponifying agent in Example 1, 100% in Example 2, 31% in Examples 3, 4, and 5, and 12% in Example 6, acts as a simultaneous saponifying and reducing agent not only against oxygen of the air but also against oxygen carrying substances present in the oil or fat soluble vitamin containing materials.

The improvements are not limited to the use of sodium sulfide. Potassium, ammonium, lithium, or any of the other water soluble alkaline sulfides may be used alone or in conjunction with alkali hydroxides. Or CaS, SrS, BaS or like sulfide may be used as the alkaline sulfides. In fact, there may be used any sulfide which under the conditions of the reactions described will give off hydrogen sulfide actually or in situ, forming an alkaline reducing medium, falls within the scope of the invention.

The same results may also be accomplished by passing $H_2S$ gas into the alkaline soap solution as produced by saponification with an alkali metal hydroxide, thus forming an alkaline sulfide in the solution. The cheapness and convenience of using alkaline sulfides on a commercial scale make it more practical, however, to use the alkaline sulfides than hydrogen sulfide.

The amounts of the sulfides used in th examples may be varied so long as the required reducing condition is created during the saponification and remains during the subsequent extraction or recovery of the vitamins from the soap solution. The improvements described are not, furthermore, limited to the saponification of vitamin containing oils. Other vitamin containing fatty substances, such as fish livers may be substituted for the oils in the above examples and digested and saponified directly, using either sufficient alkaline sulfide alone or mixtures of alkaline sulfide and alkaline hydroxides.

The concentrates obtained by means of the described improvements compare favorably in appearance, color, odor and taste with those prepared by conventional methods without the benefit of the described improvements, and in practically all cases, show a higher vitamin A potency, even though the use of an inert atmosphere is omitted in the method. The concentrates prepared by my improved methods also retain their vitamin A potency for longer periods especially when exposed to air and light, since they are substantially free of oxidized material which may serve to catalyze further oxidation.

It will be understood also that it is intended to cover all changes and modifications of the examples of the invention herein chosen for the purpose of illustration which do not constitute departures from the spirit and scope of the invention.

What I claim is:

1. In the extraction of fat soluble vitamins from a material selected from the group consisting of fish liver oils and fish livers serving as the vitamin containing material by the method which includes alkali saponification of fats in the said material and then separating the vitamins from the resulting mixture, the improvement which comprises effecting the saponification of the fats by heating the material with an alcoholic solution of mixed alkali metal hydroxide and alkali metal sulfide containing a substantial proportion of both the hydroxide and sulfide, the sulfide in this process serving as a saponifying agent and providing sulfide ion in direct contact with the vitamins from the first moment of their separation from the fats to prevent oxidation of the vitamins.

2. In extracting the vitamins from vitamin containing fish liver oil by the method which includes alkali saponification of fats in the fish liver oil and separation of the vitamins from the resulting mixture, the improvement which comprises effecting the alkali saponification by heating the fish liver oil in alcoholic solution with an aqueous solution of an alkali metal hydroxide and an alkali metal sulfide containing a substantial proportion of both the hydroxide and sulfide, the sulfide serving during the heating as a saponifying agent and also providing sulfide ion in direct contact with the vitamins from the first moment of their liberation from the said fats, to prevent oxidation of the vitamins.

LOUIS FREEDMAN.

REFERENCES CITED

The following references are of record in the file of this patent:

UNITED STATES PATENTS

| Number | Name | Date |
|---|---|---|
| 2,202,103 | Hitchcock et al. | May 28, 1940 |
| 2,327,766 | Cawley | Aug. 24, 1943 |
| 2,389,955 | Buxton | Nov. 27, 1945 |

OTHER REFERENCES

Merck's Index, 5th ed. (1940), pg. 278. (Copy in Div. 43.)

Martin-Modern Soap and Detergent Industry, vol. 2 (1925), pg. 34. (Copy in Div. 64.)

Meerbott & Stanislaus, Am. Soap Maker's Guide (1928), page 315. (Copy in Div. 64.)